United States Patent
Walter et al.

(10) Patent No.: US 11,156,634 B2
(45) Date of Patent: Oct. 26, 2021

(54) MICROMECHANICAL SENSOR WITH OPTICAL TRANSDUCTION

(71) Applicants: VMICRO, Villeneuve d'Ascq (FR); CENTRE NATIONAL DE LA RECHERCHE SCIENTIFIQUE, Paris (FR); UNIVERSITE LILLE-1, Villeneuve d'Ascq (FR)

(72) Inventors: Benjamin Walter, Lille (FR); Marc Faucher, Lesquin (FR); Estelle Mairiaux-Mage, Villeneuve D'Ascq (FR)

(73) Assignees: VMICRO, Villeneuve d'Ascq (FR); CENTRE NATIONAL DE LA RECHERCHE SCIENTIFIQUE, Paris (FR); UNIVERSITE LILLE-1, Villeneuve d'Ascq (FR)

( * ) Notice: Subject to any disclaimer, the term of this patent is extended or adjusted under 35 U.S.C. 154(b) by 0 days.

(21) Appl. No.: 16/325,127

(22) PCT Filed: Aug. 1, 2017

(86) PCT No.: PCT/EP2017/069477
§ 371 (c)(1),
(2) Date: Feb. 12, 2019

(87) PCT Pub. No.: WO2018/029049
PCT Pub. Date: Feb. 15, 2018

(65) Prior Publication Data
US 2021/0293850 A1    Sep. 23, 2021

(30) Foreign Application Priority Data
Aug. 12, 2016 (FR) ...................... 1657760

(51) Int. Cl.
*G01Q 60/38* (2010.01)
*G01Q 20/02* (2010.01)
*G01P 15/093* (2006.01)

(52) U.S. Cl.
CPC ............ *G01Q 60/38* (2013.01); *G01P 15/093* (2013.01); *G01Q 20/02* (2013.01)

(58) Field of Classification Search
CPC ........ G01Q 20/02; G01Q 60/24; G01Q 60/38; G01P 15/093; B81B 3/0021
See application file for complete search history.

(56) References Cited

U.S. PATENT DOCUMENTS

| | | | |
|---|---|---|---|
| 8,997,258 B2 | 3/2015 | Aksyuk et al. | |
| 2014/0047585 A1* | 2/2014 | Hofrichter | G01Q 60/38 850/56 |
| 2014/0338074 A1* | 11/2014 | Aksyuk | G01Q 20/02 850/6 |

FOREIGN PATENT DOCUMENTS

| | | |
|---|---|---|
| JP | 2014-149507 A | 8/2014 |
| JP | 2014149507 A * | 8/2014 |

(Continued)

OTHER PUBLICATIONS

Liu et al, "Wide Cantilever Stiffness Range Cavity Optomechanical Sensors for Atomic Force Microscope", Optics Express 18268-18280, 2012 (Year: 2012).*

(Continued)

*Primary Examiner* — David E Smith
(74) *Attorney, Agent, or Firm* — BakerHostetler (57) ABSTRACT

A micromechanical sensor includes a movable micromechanical element and an optical resonator of disk or ring type, wherein the optical resonator has at least one interruption; and in that the movable micromechanical element is mechanically coupled to the optical resonator in such a way that a movement of the movable micromechanical element (Continued)

induces a modification of the width of the interruption of the optical resonator by moving at least one edge of the interruption in a direction substantially parallel to a direction of propagation of the light in the resonator at the interruption.

15 Claims, 6 Drawing Sheets

(56) References Cited

FOREIGN PATENT DOCUMENTS

| WO | 2004/112050 A1 | 12/2004 | |
|---|---|---|---|
| WO | WO-2004112050 A1 * | 12/2004 | ............. G01Q 20/02 |

OTHER PUBLICATIONS

Ikeda and Hane, "A Tunable Notch Filter Using Micromechanical Microring with Gap-Variable Busline Coupler", Optics Express, vol. 21, No. 19, p. 22034, 2013 (Year: 2013).*

Ikeda, et al., "A tunable notch filter using microelectromechanical microring with gap-variable busline coupler", Optics Express, vol. 21. No 19, p. 22034, Sep. 11, 2013.

Liu, et al., "Wide cantilever stiffness range cavity optomechanical sensors for atomic force microscopy ", Optics Express, vol. 20, Issue 16, p. 18268-18280, (2012).

Giessibl, et al., "Exploring the nanoworld with atomic force microscopy", Physics Today, vol. 59, Issue 12, p. 44, Dec. 1, 2006.

* cited by examiner

MICROMECHANICAL SENSOR WITH OPTICAL TRANSDUCTION

CROSS-REFERENCE TO RELATED APPLICATIONS

This application is a National Stage of International patent application PCT/EP2017/069477, filed on Aug. 1, 2017, which claims priority to foreign French patent application No. FR 1657760, filed on Aug. 12, 2016, the disclosures of which are incorporated by reference in their entirety.

FIELD OF THE INVENTION

The invention relates to a micromechanical sensor using optical detection of movement. The invention is in particular but not exclusively applicable to atomic force microscopy.

BACKGROUND

Atomic force microscopy (AFM) is a scanning microscopy technique that was developed in the 80s and that allows atomic-scale resolution to be achieved. Contrary to tunneling scanning microscopy, atomic force microscopy is not limited to the formation of images of conductive surfaces, this making it suitable for insulators, semiconductors, or even for samples of biological nature. This technique is applicable to many fields of pure and applied research, but also to the microelectronics industry. A general introduction to the principles of AFM is provided in the article by F. J. Giessibl and C. F. Quate "*Exploring the nanoworld with atomic force microscopy*", Physics Today, December 2006, pages 44-50.

The essential component of a conventional atomic force microscope is a probe consisting of a lever embedded at one end and provided, at the opposite end, with a tip that is oriented toward the surface of the sample to be observed. The lever generally has a length of about a few tens or hundreds of microns, and the tip a radius of curvature of a few tens or hundreds of nanometers. Such a probe, which is generally made of silicon nitride or single-crystal silicon, may be manufactured using conventional photolithography techniques, at a low cost. When the tip of the probe is brought close to a surface, it experiences the influence of attractive or repulsive forces that are of chemical nature and/or that are van der Waals, electrostatic and/or magnetic forces. By measuring these forces while the tip scans the surface of the sample to be observed, it is possible to reconstruct an image of the latter. The forces exerted between the tip and the sample may be measured in various ways. In the simplest and oldest technique (static AFM) the deflection of the embedded lever holding the tip is merely observed, in particular by optical means.

A better sensitivity may be obtained by making this lever vibrate in one of its flexural eigenmodes, and by observing the variations in the resonant frequency that are induced by the gradients of these forces (dynamic AFM). In practice, the dynamic technique is generally preferred for observations carried out in vacuum or in air. This technique is less suitable for observations in liquid medium, because the vibrations of the lever are highly damped therein, thereby decreasing the quality factor of the probe.

It is also known to use AFM probes that exploit planar vibrational modes—"longitudinal" or "vertical movement" also being spoken of—which allow very high quality factors to be achieved even with dynamic AFM in viscous media.

Whatever the chosen geometry, it is necessary to produce a transducer that allows the movements of the AFM tip to be detected. Such a transducer must have both a high sensitivity and a high dynamic range, because the movements to be detected may have an amplitude ranging from less than one picometer to several hundred nanometers. This is relatively simple in the case of a conventional probe, of the embedded lever type operating in flexion, with which the deflection of a laser beam reflected by the lever may be exploited, but it is much less so in the case of a longitudinal probe. The same problem arises in the case of micromechanical sensors other than AFM probes, accelerometers for example.

The article by Y. Liu et al. "Wide cantilever stiffness range cavity optomechanical sensors for atomic force microscopy" Optics Express Vol. 20, No. 16, pp. 18268-18280 (2012) and U.S. Pat. No. 8,997,258 disclose AFM probes comprising a lever that is able to be brought close to an optical resonator of ring or disk type, perturbing the resonant conditions of the latter.

The operating principle of these transducers exploits an interaction between the lever and evanescent waves in proximity to the exterior surface of the optical resonator. In this configuration, only certain optical resonant modes of the resonator are modulated. The identification of the modes is therefore very difficult, because all thereof are not shifted in frequency by the same amount in response to the variation in the distance between the lever and the resonator. In addition, the areas that face are large: the device is highly sensitive to capillary forces (in particular in liquid) which may cause the lever to bond to the optical resonator.

Moreover, AFM probes (just like other micromechanical sensors such as styluses) are subjected to asymmetric stresses. Thus, in the case of a longitudinal AFM probe, the tip is liable to experience repulsive forces that are much stronger than the attractive forces—the limiting case being abutment. However, in the case of the aforementioned prior-art systems, this may lead to the lever and optical resonator making contact, which may damage these elements or cause adhesion thereof.

SUMMARY OF THE INVENTION

The invention aims to solve all or some of these drawbacks of the prior art.

According to the invention, this aim is achieved using an optical transducer based on a resonator of ring or disk type, having at least one interruption, or slit. A movable micromechanical element, such as a beam able to be animated with a longitudinal movement, is coupled to the resonator in such a way that a movement of the micromechanical element opens or closes the interruption. This results in a modification of the length of the resonator, and therefore of its resonant wavelength, whatever the mode in question; this modification may therefore easily be detected. The facing areas are small, above all in the case of a ring resonator having a single interruption, decreasing the risk of adhesion via the effect of capillary forces.

Advantageously, a device according to the invention and intended to operate in the presence of asymmetric stresses will be designed in such a way that the movements of larger amplitude of the movable micromechanical element open the one or more interruptions, decreasing the risk of damage to the resonator.

The interruption introduces losses into the resonator, and therefore decreases its quality factor. This drawback is however broadly compensated for by the mechanical advantages of the interruption, which advantages will be used in more detail below.

One subject of the invention is therefore a micromechanical sensor comprising a movable micromechanical element and an optical resonator of disk or ring type, characterized in that the optical resonator has at least one interruption; and in that the movable mechanical element is mechanically coupled to the optical resonator in such a way that a movement of the movable micromechanical element induces a modification of the width of the interruption of said optical resonator by moving at least one edge of said interruption in a direction substantially parallel to a direction of propagation of the light in the resonator at the interruption.

According to advantageous embodiments of such a sensor:

The movable micromechanical element may extend in what is called a longitudinal direction and have a degree of freedom in translation in said longitudinal direction. More particularly, the movable micromechanical element may be borne by a planar substrate having a main surface parallel to the longitudinal direction and protrude from one edge of said substrate by extending in what is called a positive orientation of said longitudinal direction. Even more particularly, the movable micromechanical element may be mechanically coupled to the optical resonator in such a way that its movement in the longitudinal direction with what is called a negative orientation, which is opposite to the positive orientation, induces an increase in the width of the interruption of the optical resonator. Moreover, the optical resonator may be borne by the planar substrate and be substantially aligned with the micromechanical element in the longitudinal direction.

The one or more interruptions of the optical resonator may be oriented in a direction, called the transverse direction, that is perpendicular to the longitudinal direction and separate the optical resonator into two separate portions, one of which is mechanically coupled to the movable micromechanical element whereas the other of which is anchored to the substrate.

The movable micromechanical element may be directly connected to said portion of the optical resonator.

As a variant, the movable micromechanical element may be coupled to said portion of the optical resonator by way of a movement-inverting mechanical structure.

Said resonator may be of ring type and have at least one interruption oriented in the longitudinal direction, the movable micromechanical element being mechanically connected at two points of said resonator that are located on either side of said interruption by way of a mechanical structure suitable for converting a movement in the longitudinal direction into a force in the transverse direction. More particularly, said mechanical structure suitable for converting a movement in the longitudinal direction into a force in the transverse direction may comprise a fork-shaped flexible structure having two branches connected to the two said points of the resonator that are located on either side of the interruption.

The one or more interruptions of the optical resonator may separate the latter into two separate portions, one of which is mechanically coupled to the movable micromechanical element whereas the other of which is anchored to the substrate.

The optical resonator may be is of ring type, have a single interruption and form, with the movable micromechanical element, a mass-spring system.

The movable micromechanical element may bear a local-probe microscopy tip extending in the longitudinal direction.

The micromechanical sensor may also comprise at least one optical waveguide optically coupled to the optical resonator.

In a rest state in which no external force acts on the movable micromechanical element, the width of the or each interruption of the optical resonator may be comprised between 0.1 nm and 1 µm, and preferably between 10 nm and 200 nm.

BRIEF DESCRIPTION OF THE DRAWINGS

Other features, details and advantages of the invention will become apparent on reading the description given with reference to the appended drawings, which are given by way of example and which show, respectively.

DETAILED DESCRIPTION

The invention will be described with reference to the embodiments that all relate to probes for AFM, and more particularly for longitudinal AFM. However, it is not limited to this particular application.

The probes of FIGS. 1 to 6 may be produced from a structure of the silicon-on-insulator (SOI) type, comprising:

a silicon substrate, noted SS in the figures, in general of a thickness of 20 µm to 1 mm, and preferably of between 50 and 600 µm;

a buried oxide ($SiO_2$) layer (referred to as a BOX for buried oxide), generally of a thickness comprised between 0.1 µm and 5 µm, and preferably of between 0.2 µm and 2 µm; and a thin silicon layer (thickness generally comprised between 1 nm and 100 µm, and preferably between 0.2 µm and 5 µm), called the "device layer".

The mechanical elements of the probe are produced from the device layer, and are released by wet etching the subjacent BOX layer. The BOX layer remains underneath the anchors that connect the probe to the substrate SS.

It is also possible to produce the probe from a material other than SOI, for example SiN deposited on Si. It is also possible to produce certain portions of the probe in the device layer on SOI and others in a material such as $Si_3N_4$ or any other material having suitable mechanical properties. In practice, any material having a sufficiently high ratio between Young's modulus E and density ρ (typically $$1\frac{km}{s} \le \sqrt{\frac{E}{\rho}} \le 12\frac{km}{s})$$

may be suitable for implementing the invention. By way of example, the silicon $$\sqrt{\frac{E}{\rho}} = 9 \frac{\text{km}}{\text{s}}$$

and the silicon carbide $$\sqrt{\frac{E}{\rho}} = 12 \frac{\text{km}}{\text{s}}.$$

Generally, the device layer is located above a surface of the substrate, directly or via interposition of intermediate layers (BOX in the case of an SOI structure).

Figure 1:
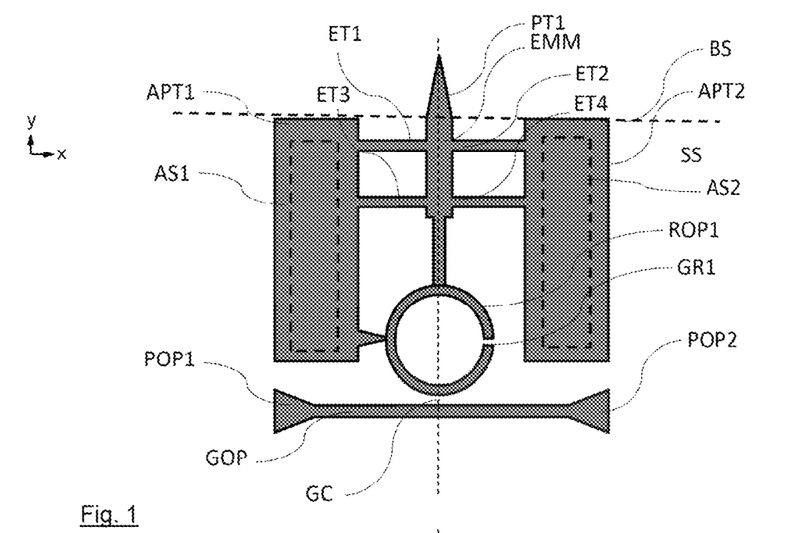
FIG. 1, a micromechanical device according to a first embodiment of the invention.

The probe of FIG. 1 comprises a beam-shaped movable micromechanical element EMM extending in what is called a longitudinal direction y, and protrudes from the edge BS of the substrate in said longitudinal direction. It terminates with an AFM tip—reference PT1—that also extends in the positive orientation of said longitudinal direction. The beam EMM is connected to two anchors APT1, APT2 by four beams ET1, ET2, ET3, ET4 that extend in what is called a transverse direction x (the xy plane is parallel to the surface of the substrate). In their turn, the anchors APT1, APT2 are fastened to the substrate by buried-oxide regions APS1, APS2 that were not removed during the release of the structure; these regions are delineated by dashed lines. The beams ET1-ET4, which are located on either side of the element EMM, are flexible so as to allow the micromechanical structure to make a reciprocal movement in the longitudinal direction y.

The rear end (i.e. the end opposite the tip PT1) of the micromechanical element EMM is connected to an optical resonator ROP1 of ring type. The term "ring" must be understood in the topological sense, and covers the case of a circular ring (as in FIG. 1), of an elongate ring (see FIG. 2) or of a ring of more complex shape (as in the case of FIG. 4). This resonator has, at about 90° from the link with the element EMM (at "three o'clock", if the positive orientation of the y-direction corresponds to "12 o'clock"), an interruption, or slit, GR1 of width typically comprised between 0.1 nm and 1 µm, and preferably between 10 nm and 200 nm (this goes for a use of the device at a wavelength of 1.55 µm, which is the most frequent case; more generally, the width of the slit is proportional to the wavelength). The width of the interruption results from a compromise: a wide interruption permits substantial movement of the element EMM, and therefore of the tip PT1, but significantly decreases the quality factor of the optical resonator. In contrast, a narrow interruption limits the movement of the element EMM but introduces few optical losses.

Moreover, the resonator is fastened, by a fastening point located on the side thereof opposite to the slit GR1, to the anchor APT1.

A planar optical waveguide GOP is arranged behind the resonator, in immediate proximity to the latter (the spacing GC between these two components is typically about 200 nm or less), so as to allow evanescent coupling. A light wave propagates from an optical port POP1 at one end of the guide GOP to an optical port POP2 located at the opposite end. The evanescent coupling through the interval GC excites an electromagnetic resonant mode of the resonator; some of the light flux injected into the port POP1 therefore does not reach the port POP2. Preferably, the optical resonator and the waveguide are single-mode The resonator ROP1 and the waveguide GOP may for example be produced in the device layer itself, made of silicon, this implying the use of infrared radiation and a device layer having a suitable thickness (of about a number of hundred nanometers). As a variant, they may be produced from a dielectric deposited above the device layer.

Forces exerted by the surface of a sample on the tip PT1 cause a movement of the mechanical element EMM in the longitudinal direction (y); the latter deforms the ring resonator ROP1 thereby opening the interruption GR1 (if the movement occurs in the positive orientation of the y-axis) or closing it (if the movement occurs in the negative orientation of y). GR1 is partially opened or closed by moving its edges in a direction that is substantially parallel to the direction of propagation of the light in the resonator—i.e. a tangential direction in the case of a circular resonator; in the particular case of FIG. 1, the interruption GR1 being oriented in the x-direction, its edges move in the y-direction. A variation in the length of the resonator, and therefore in its resonant wavelength, results. This leads to a variation in the light intensity at the exit POP2 of the optical guide GOP (if the radiation propagating in this guide has a narrow bandwidth with respect to the peak of the resonator) or in its spectrum (if this radiation has a wider bandwidth). In contrast, the level of losses in the resonator is hardly affected by the variation in the width of the interruption, provided that it remains relatively small, because the misalignment of its edges remains minimal.

It is advantageous to note that the interrupted optical resonator ROP1 also has a mechanical spring function. It contributes, just like the transverse beams ET1-ET4, to the stiffness of the probe in the longitudinal direction, and therefore to its mechanical resonant frequency. One advantage of the invention is that the interrupted optical resonator ROP1 may be dimensioned quite freely so as to increase or decrease its stiffness; it therefore places few constraints on the mechanical resonant frequency of the probe. This would not be the case for an uninterrupted resonator, which would be very stiff and which would highly constrain the mechanical resonant frequency of the probe.

Figure 2:
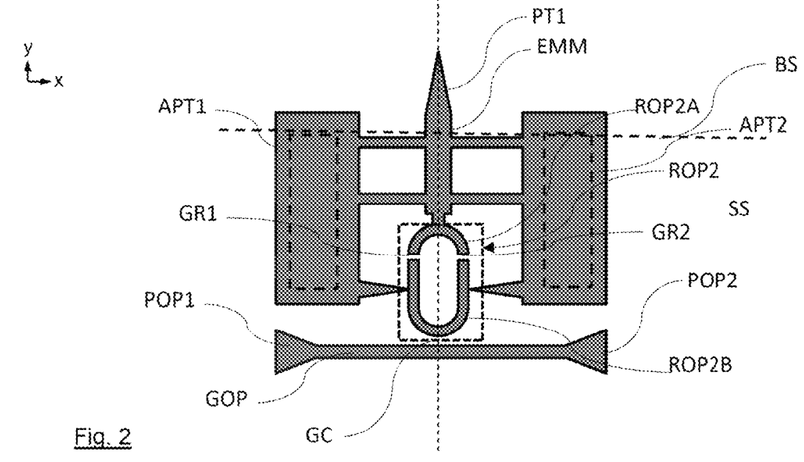
FIG. 2, a micromechanical device according to a second embodiment of the invention.

FIG. 2 shows a probe according to a second embodiment, which differs from the first in that its optical resonator ROP2 has an elongate shape and—above all—includes two interruptions GR1, GR2 that are located on either side of the mechanical link with the micromechanical element EMM. These two interruptions separate the resonator ROP2 into two separate portions one of which—ROP2A—is fastened to the movable mechanical element EMM, whereas the other of which—ROP2B—is connected to the substrate via the anchors APT1, APT2. As in the embodiment of FIG. 1, a longitudinal movement of the element EMM opens or closes the interruptions GR1, GR2, thereby modifying the length of the resonator and therefore its resonant wavelength. Contrary to the case of FIG. 1, however, the resonator does not contribute to the stiffness of the probe, and therefore plays almost no mechanical role (except a small contribution of its movable portion ROP2A to the mass of the element EMM). It should also be noted that the presence of two interruptions instead of a single induces higher losses; all other things being equal, the resonator of FIG. 2 will therefore have a lower quality factor than that of FIG. 1.

Figure 3:
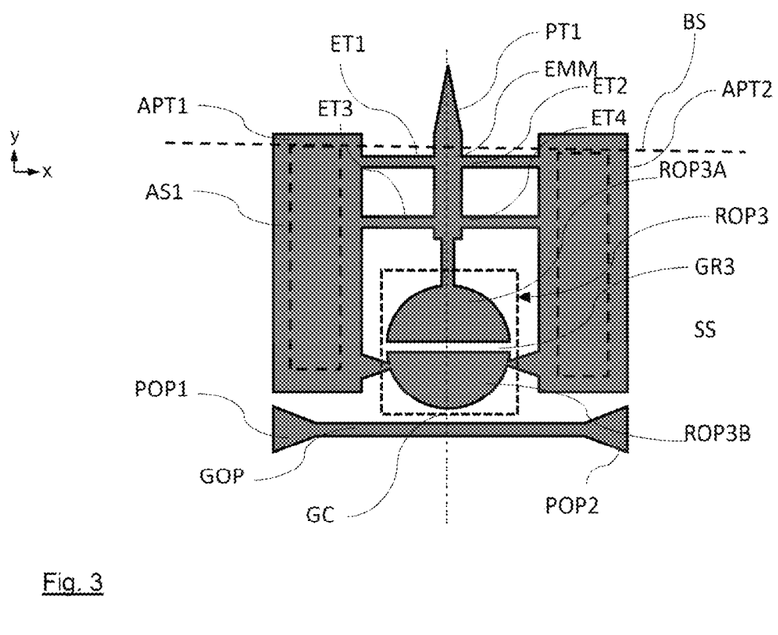
FIG. 3, a micromechanical device according to a third embodiment of the invention.

FIG. 3 shows a probe according to a third embodiment, which is similar to the second, except that its optical resonator ROP3 is of disk type, and separated into two portions ROP3A and ROP3B by a slit (interruption) GR1 that extends all its width. The first portion ROP3A, which is mobile, is connected to the element EMM, whereas the second portion ROP3B, which is fixed, is connected to the substrate by way of the anchors APT1, APT2.

In these three embodiments, the interruptions GR1, GR2, GR3 extend in the transverse direction x, but this is not is not strictly necessary.

The embodiments of FIGS. 1 to 3 have a drawback. Specifically, in case of substantial movement of the movable mechanical element EMM—for example caused by abutment of the tip PT1 against the surface of a sample—the interruptions GR1, GR2, GR3 could close completely, running the risk of adhesion between the edges thereof, or of breakage of the optical resonator. To avoid this risk, it would be preferable for a movement of the movable micromechanical element EMM in the negative orientation of the longitudinal direction y to induce opening of the slits of the resonator, and vice versa. Specifically, it is not very likely that a substantial movement of the movable micromechanical element EMM will occur in the positive orientation of the longitudinal direction y, because this would require a strong attractive force to exert itself on the tip PT1. This effect is obtained in three different ways in the embodiments of FIGS. 4, 5 a 6.

Figure 4:
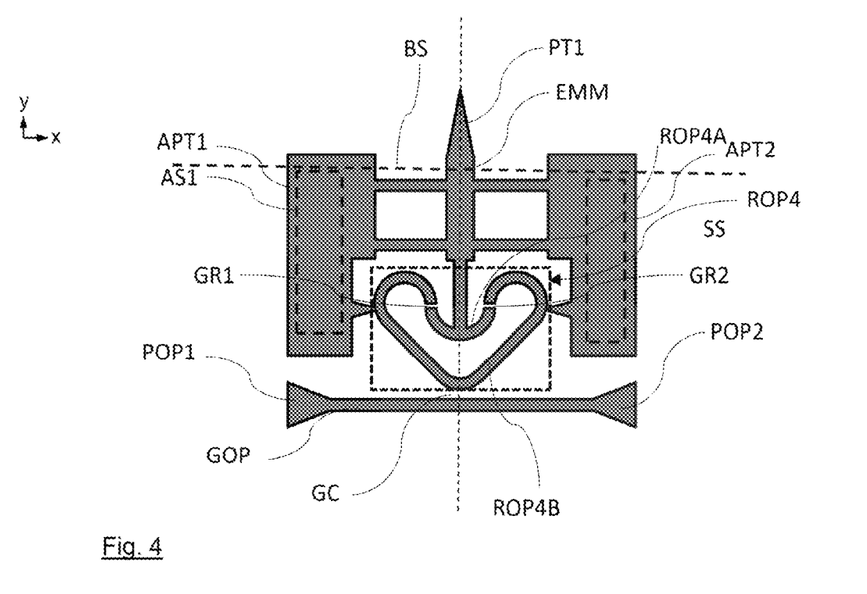
FIG. 4, a micromechanical device according to a fourth embodiment of the invention.

In the case of FIG. 4, the optical resonator ROP4 has a "heart" shape the tip of which is directed rearward (negative orientation of the longitudinal axis y). Two interruptions GR1, GR2 separate the concave portion ROP4A, which is located between the two "lobes" of the "heart", from the rest of the resonator, ROP4B. This portion ROP4A is connected to the element EMM, and therefore movable, whereas the portion ROP3B is fixed, being connected to the substrate by way of the anchors APT1, APT2. It may easily be seen that a movement of the tip, and therefore of the micromechanical element EMM, toward the rear (negative orientation of the axis y) tends to open the interruptions GR1, GR2, this being the desired result.

Figure 5:
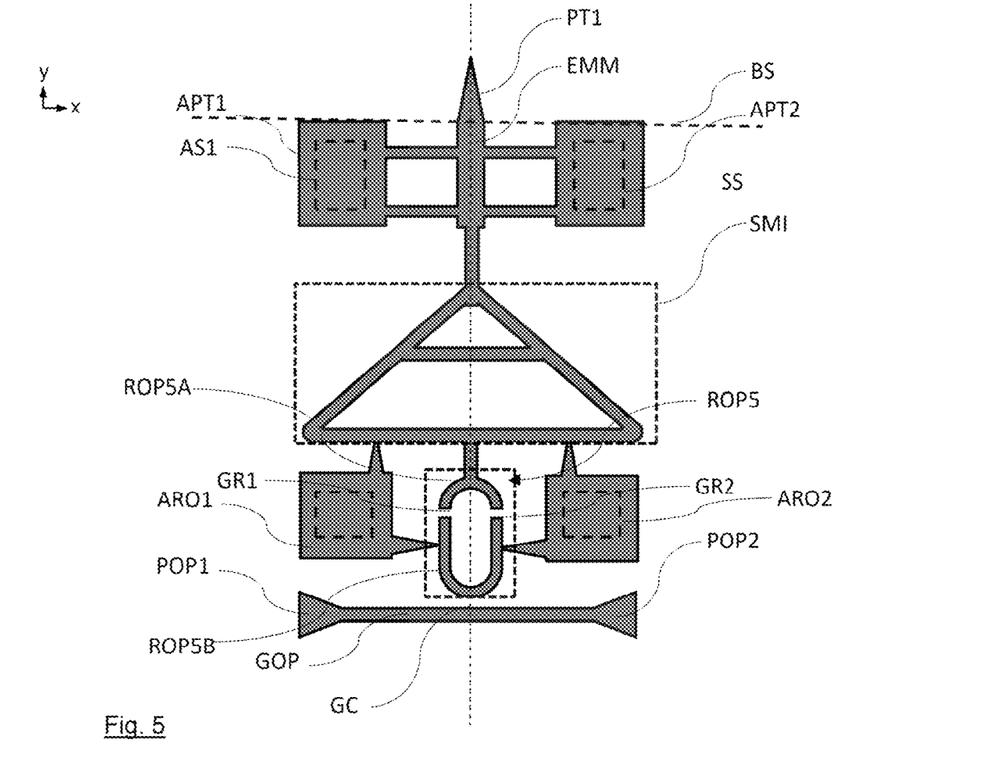
FIG. 5, a micromechanical device according to a fifth embodiment of the invention.

In the embodiment of FIG. 5, the optical resonator ROP5 is of elongate-ring type; two interruptions GR1, GR2, extending in the transverse direction x, subdivide this resonator into two portions that are aligned in the longitudinal direction: one, ROP5A, is located toward the front (positive orientation of y) and movable; the other, ROP5B, is located toward the rear (negative orientation of y) and connected to the substrate by anchors ARO1, ARO2. As in the case of the anchors APT1, APT2, the dashed lines denote the presence of a buried oxide. Contrary to the case of FIG. 2, however, the movable portion ROP5A of the optical resonator is connected to the movable micromechanical element EMM indirectly, by way of a movement-inverting mechanical structure SMI, which converts a rearward movement of the element EMM into a forward movement of ROP5A, and vice versa. In the example of FIG. 5, the movement-inverting mechanical structure SMI has a triangular shape with an apex directly connected to the element EMM and a base opposite this apex. The movable portion ROP5A of the resonator is connected to the center of the base. The latter is moreover connected to the anchors ARO1, ARO2—and therefore, indirectly, to the substrate, by way of flexible links, which may be modeled as pivots, and which are located halfway between the ends of the base and its center. Thus, a movement of the element EMM in the longitudinal direction causes a flexion of the base of the triangle, this driving the movable portion ROP5A of the resonator. It will be understood that a rearward movement of the tip PT1, and therefore of the element EMM, causes a forward movement of ROP5A, this causing the interruptions GR1, GR2 to open.

Figure 6:
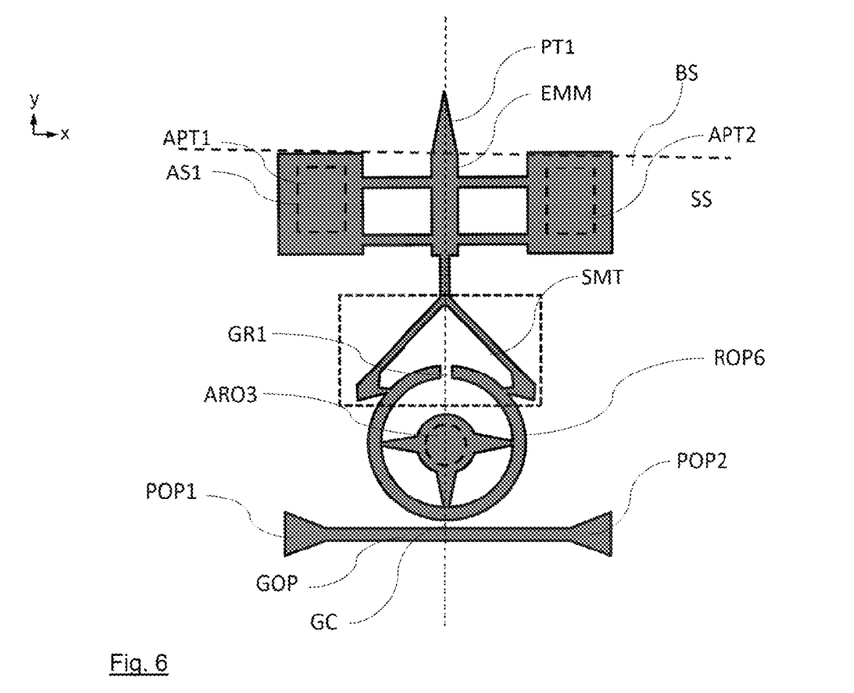
FIG. 6, a micromechanical device according to a sixth embodiment of the invention.

In the embodiment of FIG. 6, the optical resonator ROPE is of ring type, the ring being substantially circular and having a single interruption GR1 in its front portion (at "12 o'clock"). Moreover, the resonator is connected to the substrate by way of a central anchor ARO3; the junction points between the anchor and the resonator are away from the interruption GR1, for example located at "three o'clock", "six o'clock" and "nine o'clock". The resonator is also connected to the movable micromechanical element EMM by way of a movement-converting structure SMT that converts the movement along the y-axis of the element EMM into a force that is oriented along the x-axis. More particularly, the structure SMT takes the form of a fork, the two flexible branches of which are fastened to the resonator on either side of the interruption GR1. It will be understood that a movement of the element EMM rearward creates a force tending to separate the edges of the interruption GR1, and vice versa in the case of a forward movement. As in the case of FIG. 1, the resonator GR3, and the movement-converting structure, behave like springs and contribute to the mechanical stiffness of the probe.

The invention has been defined with respect to a certain number of embodiments, but is not limited to the latter. For example, it is possible to envision movement-inverting/converting structures different from those illustrated in FIGS. 5 and 6. In addition, it is not essential for the element EMM to move in the longitudinal direction; it is possible to envision embodiments of the invention in which the movement of the movable micromechanical element EMM that causes the one or more interruptions of an optical resonator to open or close to be a transverse movement (in x), or even a flexion or a torsion. In all the considered embodiments, the element EMM is a single beam oriented in the longitudinal direction, but it may also take a different and optionally more complex form. In addition, it is not essential for the element EMM and the optical resonator to be oriented in the longitudinal direction, although this simplifies the structure of the device.

Figure 7:
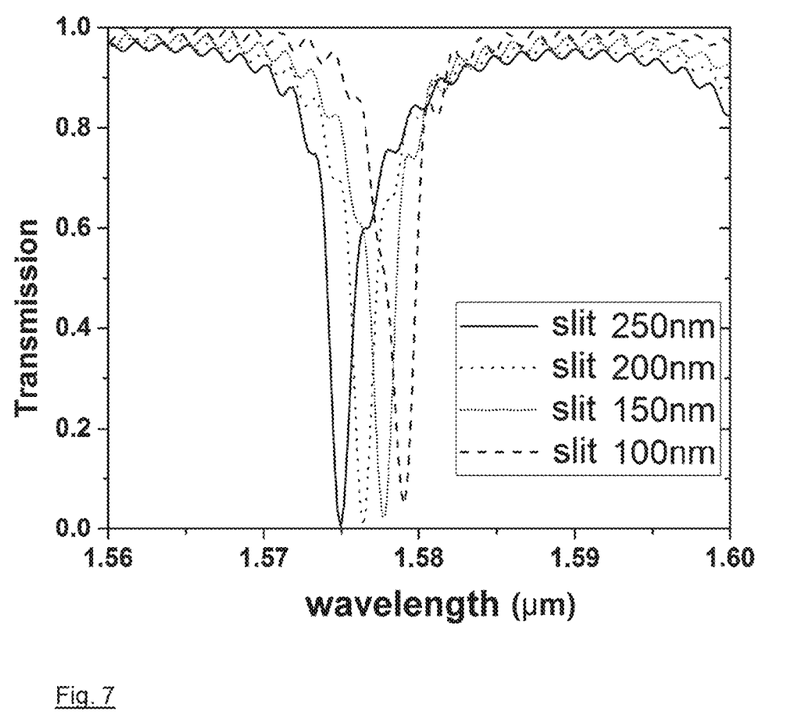
FIG. 7, numerical simulation results allowing the principle of the invention to be validated.

FIG. 7 shows graphs of the transmission coefficient of a slit ring optical resonator (radius of 3.1 μm) for four values of the width of the slit GR1: 100 nm, 150 nm, 200 nm and 250 nm. The shift in the optical resonant frequency as a function of this width may clearly be seen. The sensitivity of the sensor is 0.028 nm of optical wavelength per nm of variation in the width of the slit.

The invention claimed is:

1. A micromechanical sensor comprising a movable micromechanical element (EMM) and an optical resonator (ROP1-ROP6) of disk or ring type, wherein
   the optical resonator has at least one interruption (GR1, GR2, GR3); and
   the movable micromechanical element is mechanically coupled to the optical resonator in such a way that a movement of the movable micromechanical element induces a modification of the width of the interruption of said optical resonator, measured in a direction substantially parallel to a direction of propagation of the light in the resonator at the interruption, by moving at least one edge of the latter in said direction substantially parallel to a direction of propagation of the light in the resonator at the interruption.

2. The micromechanical sensor as claimed in claim 1, wherein the movable micromechanical element extends in what is called a longitudinal direction (y) and has a degree of freedom in translation in said longitudinal direction.

3. The micromechanical sensor as claimed in claim 2, wherein the movable micromechanical element is borne by a planar substrate (SS) having a main surface parallel to the longitudinal direction and protrudes from one edge (BS) of said substrate by extending in what is called a positive orientation of said longitudinal direction.

4. The micromechanical sensor as claimed in claim 3, wherein the movable micromechanical element is mechanically coupled to the optical resonator (ROP4, ROP5, ROP6) in such a way that its movement in the longitudinal direction with what is called a negative orientation, which is opposite to the positive orientation, induces an increase in the width of the interruption of the optical resonator.

5. The micromechanical sensor as claimed in claim 4, wherein the optical resonator is borne by the planar substrate and is substantially aligned with the micromechanical element in the longitudinal direction.

6. The micromechanical sensor as claimed in claim 4, wherein the one or more interruptions of the optical resonator are oriented in a direction, called the transverse direction (x), that is perpendicular to the longitudinal direction and separate the optical resonator into two separate portions, one of which (ROP4A, ROP5A) is mechanically coupled to the movable micromechanical element whereas the other of which (ROP4B, ROP5B) is anchored to the substrate.

7. The micromechanical sensor as claimed in claim 6, wherein the movable micromechanical element is directly connected to said portion (ROP4A) of the optical resonator.

8. The micromechanical sensor as claimed in claim 6, wherein the movable micromechanical element is coupled to said portion (ROP5A) of the optical resonator by way of a movement-inverting mechanical structure (SMI).

9. The micromechanical sensor as claimed in claim 4, wherein said resonator (ROP6) is of ring type and has at least one interruption oriented in the longitudinal direction, the movable micromechanical element being mechanically connected at two points of said resonator that are located on either side of said interruption by way of a mechanical structure (SMT) suitable for converting a movement in the longitudinal direction into a force in the transverse direction.

10. The micromechanical sensor as claimed in claim 9, wherein said mechanical structure (SMT) suitable for converting a movement in the longitudinal direction into a force in the transverse direction comprises a fork-shaped flexible structure having two branches connected to the two said points of the resonator that are located on either side of the interruption.

11. The micromechanical sensor as claimed in claim 2, wherein the one or more interruptions of the optical resonator (ROP2, ROP3, ROP4, ROP5) separate the latter into two separate portions, one of which (ROP2A, ROP3A, ROP4A, ROP5A) is mechanically coupled to the movable micromechanical element whereas the other of which (ROP2B, ROP3B, ROP4B, ROP5B) is anchored to the substrate.

12. The micromechanical sensor as claimed in claim 2, wherein the optical resonator (ROP1) is of ring type, has a single interruption and behaves like a spring.

13. The micromechanical sensor as claimed in claim 2, wherein the movable micromechanical element bears a local-probe microscopy tip (PT1) extending in the longitudinal direction.

14. The micromechanical sensor as claimed in claim 1, also comprising at least one optical waveguide (GOP) optically coupled to the optical resonator.

15. The micromechanical sensor as claimed in claim 1, wherein, in a rest state wherein no external force acts on the movable micromechanical element, the width of the or each interruption (GR1, GR2, GR3) of the optical resonator is comprised between 0.1 nm and 1 µm, and preferably between 10 nm and 200 nm.

\* \* \* \* \*